United States Patent [19]
Schmidt-Marloh et al.

[11] Patent Number: 5,738,503
[45] Date of Patent: Apr. 14, 1998

[54] METHOD FOR BALANCING AN ELECTRICALLY DRIVEN AIR BLOWER UNIT

[75] Inventors: Otfried Schmidt-Marloh, Buehlertal; Claudius Muschelknautz, Lauf; Johann Bohnert, Sasbach; Guenter Bauer; Juergen Herp, both of Buehl; Kay Kroeger, Ottersweier; Josef Wehberg, Hanover; Gerd Knoepfel, Buehl; Jochen Goehre, Karlsruhe; Henning Schroeder, Baden-Baden; Hans Kobschaetzky, Renchen, all of Germany

[73] Assignee: Robert Bosch GmbH, Stuttgart, Germany

[21] Appl. No.: 590,825

[22] Filed: Jan. 24, 1996

[30] Foreign Application Priority Data

Jan. 24, 1995 [DE] Germany ............... 195 01 959.8

[51] Int. Cl.⁶ ...................... F04B 9/02; F04B 35/04
[52] U.S. Cl. .................... 417/423.7; 417/423.7; 417/423.15; 417/423.14
[58] Field of Search ...................... 417/236, 238, 417/423.7, 423.15, 423.14

[56] References Cited

FOREIGN PATENT DOCUMENTS

| | | |
|---|---|---|
| 1573678 | 2/1971 | Germany . |
| 2528007 | 1/1977 | Germany . |
| 3508357 | 10/1985 | Germany . |
| 8806991 U | 9/1988 | Germany . |
| 4307798 | 9/1994 | Germany . |
| 4440495 | 5/1996 | Germany . |
| 1284195 | 8/1972 | United Kingdom . |

OTHER PUBLICATIONS

Auswuchtmaschine fuer Kreisel; Hofmann report, Firmenschrift der Gebr. Hofmann GmbH, Pfungstadt.

J.W. Temlinson: "The Dynamic Balancing of Turbines and Impellers". In: Workshop Practice. Aircraft Engineering. Jun. 1950, pp. 175 and 178.

Auswuchtmaschine fuer Kreisel ; Hofmann report, Firmenschrift der Gebr. Hofmann GmgH, Pfungstadt.

*Primary Examiner*—Timothy Thorpe
*Assistant Examiner*—Samantha H. Moon
*Attorney, Agent, or Firm*—Spencer & Frank

[57] ABSTRACT

A method of balancing an electronically driven air blower unit comprising a radial blower with a high-speed electronically commutated d.c. motor which drives the blower and which is of external rotor design, utilizing a balancing device into which the completely mounted air blower unit (1) can be inserted, without housing lid, and with which electrical contact (101, 102, 103; 201, 202, 203) can be made. The balancing device is provided with a control device for the motor (3, 4, 5) of the air blower unit and with a device (9) for bridging the motor electronics (10) of the air blower unit (1) itself. In order to drive the part to balanced of the air blower unit, its electromechanical transducer (3, 4, 5) is used, which for this purpose is actuated by the control device provided in the balancing device. The balancing process is essentially carried out in two compensation planes which are spaced axially from one another and are parallel with one another. This takes place on the one hand in a first compensation plane in the plane of the radial blower with possible erosion of material, and on the other hand in the second compensation plane, which lies opposite in the region of the end side of the external rotor (5), with possible attachment of material.

8 Claims, 3 Drawing Sheets

METHOD FOR BALANCING AN ELECTRICALLY DRIVEN AIR BLOWER UNIT

PRIOR ART

The invention is based on an arrangement for balancing an electrically driven air blower unit, essentially comprising a preferably single-stage radial blower and a high-speed, electronically commutated d.c. motor which drives the radial blower and is of external rotor design, with the arrangement being of the type wherein the completely mounted air blower unit is inserted, without housing lid, into a balancing device and electrical contact can be made with it, with the balancing device being provided with a control device for the motor of the air blower unit and with a device for bridging the motor electronics of the air blower unit itself, and wherein, in order to drive the part to be balanced of the air blower unit, its electromechanical transducer is used, and for this purpose is actuated by the control device provided in the balancing device.

In a known, electrically operated air blower unit (DE-43 07 798 A1) in which it is essentially a question of a combination valve, the blower, used in particular as a secondary air blower unit, for blowing additional air into the exhaust gas passage of an internal combustion engine, is driven by a d.c. motor. The d.c. motor is provided with a commutator and with brushes. Since a blower unit of this kind, in particular when used as a secondary air pump, operates with a very high rotational speed, the wear of brushes and commutator is considerable. Failures can lead to considerable damage and be very costly. Moreover, the service life of the blower is limited by this unavoidable wear of brushes and commutator.

A further viewpoint with this known blower is the design of the motor and of the blower. Here, the rotor, provided with a commutator, of the d.c. motor is provided on a shaft. This shaft projects far beyond the rotor. The fan impellers are arranged on this projecting part of the shaft. Thus, the motor and blower are arranged next to one another and are provided with a corresponding considerable overall length.

For the sake of better comprehension, brief details will be given here on the term secondary air blower unit. Two methods are known to increase the effect of the controlled catalytic converter, namely exhaust gas feedback and secondary air supply. These methods minimize the production of nitrogen oxides and reduce the content of carbon monoxides and hydrocarbons before the exhaust gas even arrives at the catalytic converter. In the case of secondary air supply, fresh air is fed to the exhaust gas passage just upstream of the engine, the internal combustion engine, in order to eliminate the hydrocarbon compounds, produced during the combustion process, and the carbon monoxide. As a result, post-combustion of the exhaust gases at temperatures of over 600° C. is achieved. In addition, during this additional combustion process heat is supplied to the catalytic converter. This is of particular significance during "cold starting" during which a relatively rich mixture is used, as a result of which the CO and HC components are automatically increased to an overproportional degree. As a result of the secondary air supply into the hot exhaust gases, a virtual post-combustion is brought about, during the course of which the carbon monoxides and hydrocarbons which are not combusted in the engine are subsequently oxidized or combusted. However, the secondary air supply also has a further effect. The controlled catalytic converter only operates in an optimum way starting from a specific operating temperature. This warming up phase can take some time while the motor vehicle covers several kilometers. The post-combustion as a result of a secondary air supply system increases the exhaust gas temperatures specifically in this warming up phase. Higher temperatures thus permit the controlled catalytic converter to respond more quickly and it can thus fulfill its function, of eliminating pollutants, earlier.

The known electrically operated air blower unit described above is accordingly subject to wear and is of relatively bulky design. This means on the one hand considerable costs and on the other a large space requirement.

The problems associated with this are solved in accordance with an arrangement according to the earlier Patent Application filed in Germany by the assignee of the instant U.S. application, which application was laid open on May 15, 1996 as DE 44 40 495 A1. This solution consists essentially in a high-speed EC motor together with a radial blower. The content of this application contributes to better comprehension of the present invention.

On the basis of the high rated rotational speed, which may be approximately 30,000 revolutions per minute, extremely stringent requirements are made of the rotor with respect to the balance quality. The balancing of fan impellers by eroding material from the cover plates of the fan impeller is generally known from existing secondary air blowers. On the other hand, pressing balls into a groove in order to compensate weight during balancing has become known from Carl Schenck AG, D-64293 Darmstadt. The problematic aspect of balancing is the fact that the rotor is shaped very differently in the areas which cause unbalance. These are on the one hand the fan impeller and on the other the rotating part of the electromechanical transducer of the d.c. motor. Furthermore, owing to the shortness of the shaft on which the motor and fan impeller are situated, it is difficult or virtually impossible, to balance the rotor separately in a balance recording using external drive.

SUMMARY AND ADVANTAGES OF THE INVENTION

The problems according to the prior art discussed above generally are overcome according to the present invention by a method for balancing an electrically driven air blower unit comprising a radial blower and a high-speed, electronically commuted d.c. motor which drives the radial blower and is of external rotor design, wherein the completely mounted air blower unit is inserted, without housing lid, into a balancing device and electrical contact is made with it, with the balancing device being provided with a control device for the motor of the air blower unit and with a device for bridging the motor electronics of the air blower unit itself, so that the part of the air blower unit to be balanced is driven by the electromechanical transducer of the motor which, for this purpose, is actuated by the control device provided in the balancing device; and wherein the balancing process is essentially carried out in first and second compensation planes which are spaced axially from one another and are parallel with one another, with the balancing process being carried out on the one hand in the first compensation plane, which is the plane of the radial blower, with possible erosion of material, and, on the other hand, in the second compensation plane, which lies opposite in the region of the end wall of the external rotor, with possible attachment of material.

In contrast to the prior art, the method and according to the invention for balancing an electrically driven air blower unit as described above has the advantage of complete balancing of the air blower unit in the assembled state with advantageous combination of two balancing methods, this being carried out at a rotational speed which does not lead to damage to the air blower unit which is still unbalanced. The drive motor of the air blower unit is expediently used as a balance drive.

According to the invention this is achieved in that a balancing device is provided into which the completely mounted air blower unit can be inserted without housing lid and with which electrical contact can be made. The balancing device is provided with a control device for the motor of the air blower unit and with a device for bridging the motor electronics of the air blower unit itself. In order to drive the part, to be balanced, of the air blower unit, its electromechanical transducer is used which for this purpose is actuated by the control device provided in the balancing device. The balancing process is essentially carried out in two compensation planes which are spaced axially from one another and are parallel with one another. This takes place on the one hand in the plane of the radial blower with possible erosion of material, and on the other hand in the compensation plane which lies opposite in the region of the end side of the external rotor (end side of the annular magnet) with possible attachment of material.

By means of the measures specified in the further claims advantageous developments and improvements of the basic invention, for balancing an electrically operated air blower unit are possible.

In an advantageous refinement of the invention the balancing process takes place at a rotational speed which lies below the rated rotational speed of the EC motor of the air blower unit. According to a particularly expedient development, the EC motor which is realized in an external rotor design runs at a rated rotational speed of approximately 30.000 rpm.

According to another particularly advantageous refinement of the invention, the rotor of the EC motor is combined together with the fan impeller of the radial blower to form an inseparable assembly which is attached to one end of the rotor shaft. Both together, in this preferred design, they form the rotor, to be balanced, of the air blower unit.

In a further advantageous refinement of the invention it is particularly expedient that a bushing is provided which connects the pole housing of the rotor of the EC motor, together with the fan impeller, to the rotor shaft as an inseparable assembly, and in that this bushing is shaped rounded off at the end side with a curvature such that a uniform and low loss flow guidance is achieved at the air inlet of the fan impeller.

According to a further advantageous refinement of the invention, in the first compensation plane, the erosion of material is carried out at one or both of the two cover plates of the fan impeller. In an expedient development, in the second compensation plane the attachment of material to the end wall of the external rotor is preferably carried out in a groove provided there.

In a particularly advantageous development and refinement of the invention there is provision for compensation weights, for example in the form of balls, to be provided, in particular pressed into the groove on the end wall of the external rotor, or for compensation weights of sufficient mass and with a suitable shape to be provided in the region of the end side of the external rotor by means of other techniques such as bonding, warm embossing or embossing by means of ultrasonic sound. A further advantageous possibility is for balancing putty to be attached.

The arrangement according to the invention is distinguished in a particularly advantageous way in that it can be used in particular for balancing an electrically operated air blower unit, such as in particular a secondary air blower unit to be used for blowing additional air into devices such as for example the exhaust gas passage of an internal combustion engine, containing a brushless, electronically commutated, high-speed d.c. motor, a so-called EC motor, and a radial blower.

BRIEF DESCRIPTION OF THE DRAWING

The invention is explained in greater detail in the subsequent description by means of an exemplary embodiment illustrated in the drawing, in which.

DETAILED DESCRIPTION OF THE EXEMPLARY EMBODIMENT

Figure 1:
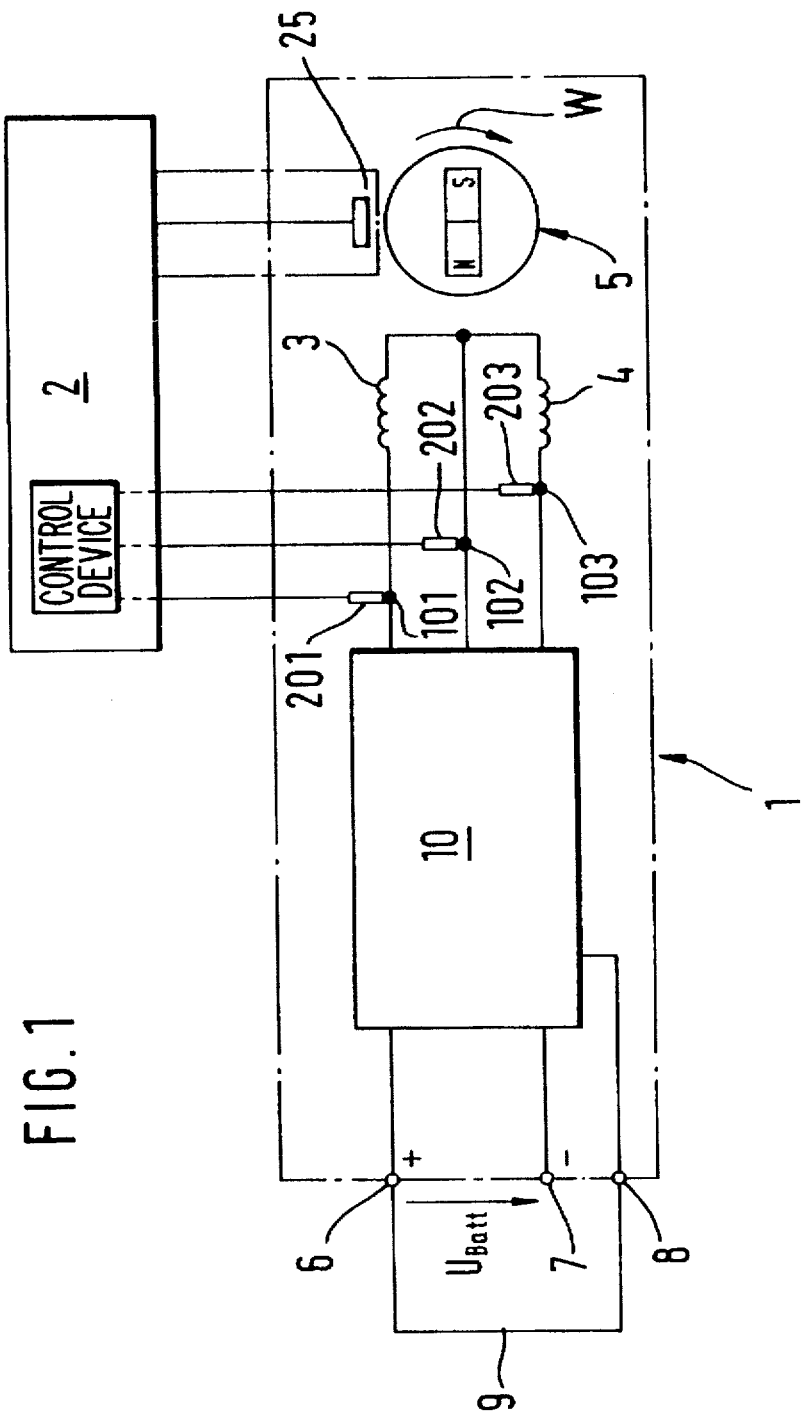
FIG. 1 is a schematic block circuit diagram of the arrangement according to the invention for balancing an electrically driven air blower unit.

An air blower unit 1 to be balanced and a balancing device 2 according to the present invention are illustrated in the schematic illustration in accordance with FIG. 1. According to the preferred exemplary embodiment the air blower unit 1 contains a brushless, high-speed, electronically commutated d.c. motor, a so-called EC motor, of which two stator windings 3 and 4, a rotor 5 provided with permanent magnets and a motor control 10 are shown within the air blower unit 1 illustrated by broken lines in FIG. 1. The motor control 10 is connected via connection terminals 6 and 7 to the positive poles and minus poles of a supply voltage $U_{batt}$. Control signals for switching the air blower unit 1 on and off are fed externally to the motor control 10 at a connection terminal 8, the control input. The motor control 10 itself produces the supply of current pulses to the windings 3 and 4 which is necessary for the desired operation. When connecting the air blower unit 1 to the balancing device 2, for the balancing process the positive pole 6 is directly connected to the connection terminal 8 by means of a short circuit strap 9. This can be realized by means of a specially shaped plug.

The balancing device 2 can be connected via three test contacts or connection contacts 201, 202 and 203 to corresponding suitable contact points 101, 102 and 103 using output lines, leading to the windings 3 and 4, of the motor control 10. Furthermore, the balancing device 2 is provided with a control device (not separately illustrated) which can be used to supply the windings 3 and 4 with current pulses during the balancing process so that the rotor 5 can rotate in the direction of the arrow w. During the balancing, the electromechanical transducer of the EC motor is therefore used to drive the parts to be balanced. The balancing device 2 also contains a sensor 25 for the angular position of the rotor 5 which serves to determine the angle of the unbalance.

Figure 2:
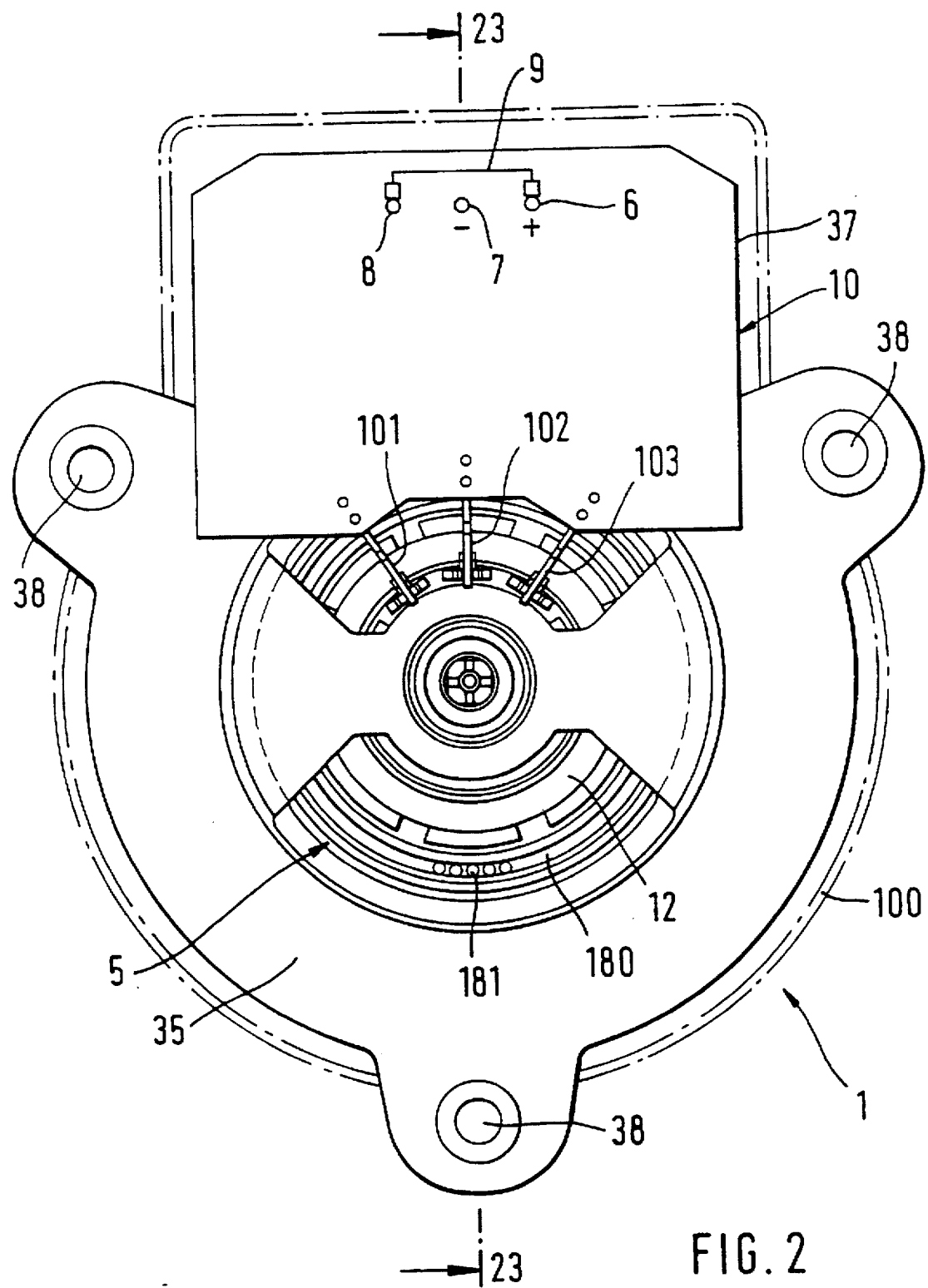
FIG. 2 shows a plan view, with the housing illustrated by broken lines, of an air blower unit to be balanced.
Figure 3:
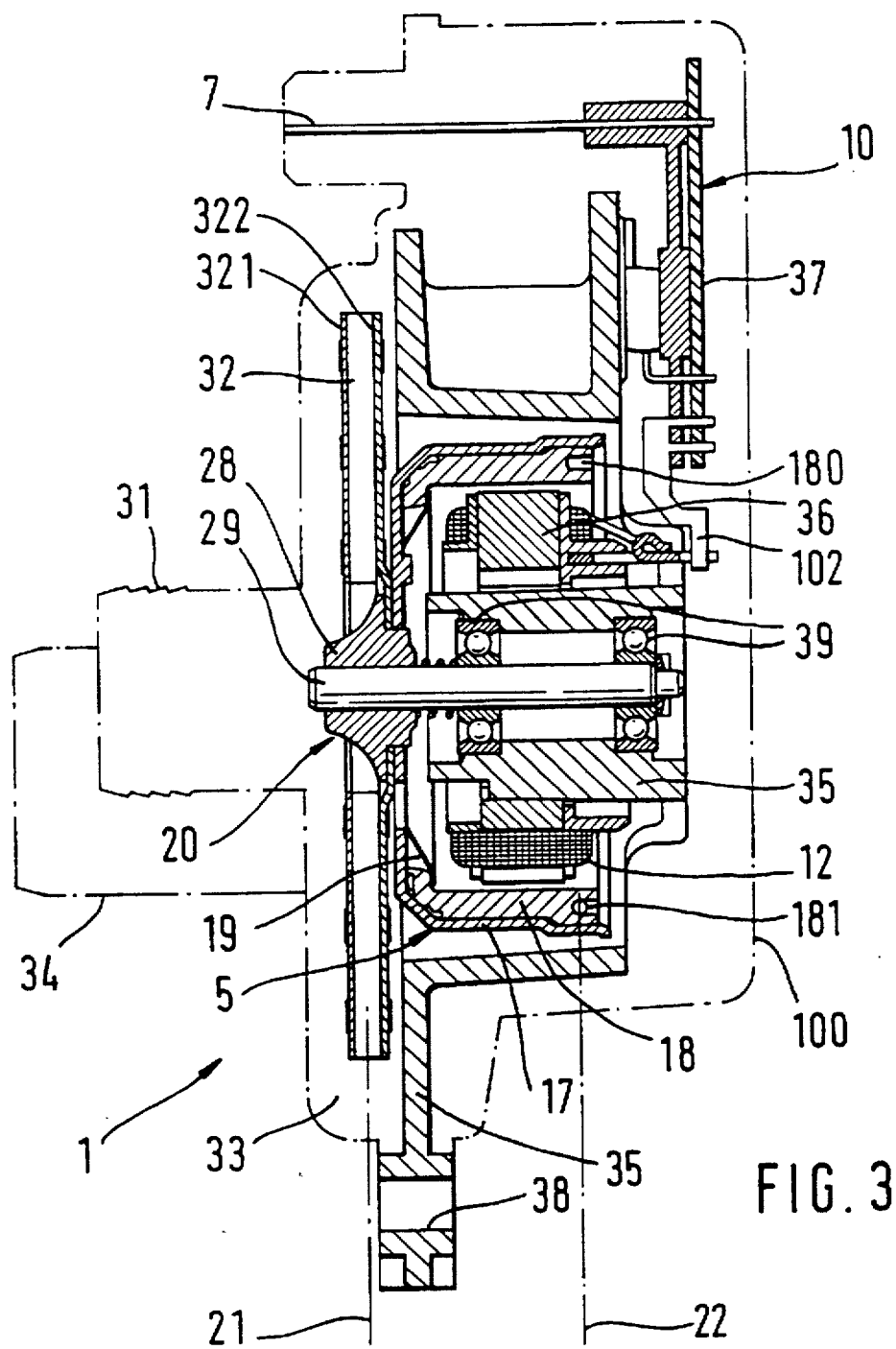
FIG. 3 shows a side view along the line 23—23 in FIG. 2, with the housing illustrated by broken lines, of the air blower unit to be balanced.

In FIGS. 2 and 3 a particularly preferred embodiment of the air blower unit 1 to be balanced is illustrated in plan view and in section along the line 23. Here, the housing 100 is indicated by broken lines.

The compactly shaped air blower unit 1 sucks in air via an intake connector 31, compresses the air by means of a fan impeller 32 in a single stage radial blower, is driven by the brushless, electronically commutated and high-speed D.c. motor 36 and outputs the compressed air via a spiral passage 33 to a pressure connector indicated by the reference 34. The air blower unit 1 contains a base body 35 which consists of metal and is preferably produced as a die cast part made of Al or Mg. The d.c. motor 36 and a printed circuit board 37 which contains the motor control 10 are arranged on this base body 35. Furthermore, the base body 35 contains three attachment eyelets 38 which are of flange-like construction and which can be used to attach the air blower unit 1 for example to the body of a vehicle, if appropriate by means of suitable isolating elements. The air blower unit is enclosed by the housing 100 which is indicated and which can also be attached to the base body 35 or screwed thereto.

The printed circuit board 37 contains the control and power electronics (not illustrated in greater detail) of the motor control 10 for actuating the EC motor 36 and for controlling the air output in terms of rotational speed. The electronically commutated D.c. motor 36 is realized in external rotor design. Its laminated stator core 12 is fitted onto a suitable receptacle of the base body 35 and pressed tight. A shaft 29 is rotatively mounted on bearings 39. A bushing or hub 28 on which the fan impeller 32 of the single stage radial blower and the rotor 5 are attached is attached to the end of the shaft 29.

The rotor 5 of the EC motor 36 which is realized in external rotor design consists according to a preferred embodiment such as is described in the earlier Patent Application DE-44 40 125 of the applicant, of a pole housing 17 and annular magnet 18 which is located therein and is attached there by means of spring elements 19. The annular magnet 18 can consist in a preferred design of a plastic-bound permanently magnetic material. The pole housing 17 is in the shape of a cup or bell and is preferably deep drawn. The pole housing 17 and the fan impeller 32 are connected by means of the bushing 28 to form an inseparable component and are attached together to one end of the shaft 29. The bushing 28 is provided at the end side, i.e. on the air intake side of the fan impeller 32, with a curvature which can correspond to a circular radius. By means of this curvature which is symmetrical to the shaft 29, a uniform, and thus also low loss, flow guidance at the inlet of the air into the fan impeller 32 is ensured at the junction of the intake connector 31 and the fan impeller 32.

In the arrangement according to the present invention, the rotor 20 (FIG. 3) which is to be balanced and comprises the rotating part of the d.c. motor 36 and fan impeller 32 which are of course permanently connected via the bushing 28 to form a common component is balanced in two planes 21 and 22, compensation planes. The one plane 21 lies here in the region of the fan impeller 32 of the radial blower. The elimination of the detected unbalance by eroding material is carried out in this compensation plane. The material is eroded here by one or both cover plates 321 and 322 of the fan impeller 32. The other compensation plane 22 lies parallel thereto and spaced axially opposite in the region of the end side of the rotor 5 of the EC motor 36. In this plane 22 the unbalanced compensation is carried out by possible attachment of material. In the exemplary embodiment (illustrated in FIGS. 2 and 3) of the rotor 5, a circumferential groove 180 is provided in the end side of the annular permanent magnet 18. For example, balls 181 are inserted into this groove 180 as compensation weights.

It is clear that balancing elements which are shaped differently and which have a suitable shape and mass can be provided as compensation weights in the compensation plane 22. The techniques used here for attaching the compensation masses can vary and comprise for example, bonding, embossing or pressing, warm embossing or warm pressing or embossing using ultrasonic sound. The use of balancing putty is also possible in order to eliminate unbalance in the compensation plane 22 by adding material.

For the purpose of balancing, the air blower unit 1 which, with the exception of the housing 100, is completely mounted is inserted into the balancing device 2 at the attachment eyelets 38 and secured. The control input terminal 8 and the positive supply voltage terminal 6 are bridged by means of the short circuit strap 9. The balancing device 2 makes contact with its test contacts 201, 202 and 203 with the contact points 101, 102 and 103, see FIGS. 1 and 2, formed for example from conductor strips, and conductor strip 102 in FIG. 3. As a result, the windings 3 and 4 of the EC motor are connected to the control device in the balancing device 2. This control device briefly speeds up the EC motor to the balancing rotational speed of for example 3,000–5,000 rpm. At the same time the balancing device detects the values required for the two compensation planes 21 and 22 and locations for the erosion of material and attachment of material, using the angular sensor 25 and the forces occurring at the three attachment eyelets 38. The balancing rotational speed can thus be selected to be substantially lower than the rated rotational speed of for example 30,000 rpm although in this process the electromechanical transducer of the air blower unit 1 itself is utilized to drive the rotor 20 to be balanced. The possible low balancing rotational speed thus avoids unnecessary damage.

In an advantageous manner, the invention thus provides the possibility of carrying out a complete balancing of a radial blower in the assembled state in a simple and reliable way using the blowers's own electromechanical transducer. Here, it is made possible to carry out the balancing in two compensation planes. Since a substantially lower balancing rotational speed can be used than corresponds to the rated rotational speed of the air blower unit, said air blower unit does not suffer any damage during balancing as a result of excessively high balancing rotational speeds.

We claim:

1. A method for balancing an electrically driven air blower unit comprising a radial blower and a high-speed, electronically commuted d.c. motor, including connected motor electronics, which drives the radial blower and which is of external rotor design, utilizing a balancing device which is provided with a control device for the motor of the air blower unit and with a device for bridging the motor electronics of the air blower unit itself, said method comprising inserting the completely mounted air blower unit, without a housing lid, into the balancing device and making electrical contact therewith to bridge the motor electronics of the air blower unit itself and in order to drive the part to be balanced of the air blower unit using its electromechanical transducer which, for this purpose, is actuated by the control device provided in the balancing device; and carrying out the balancing process essentially in first and second compensation planes which are spaced axially from one another and are parallel with one another, with the balancing process being carried out in the first compensation plane, which is the plane of the radial blower, with possible erosion of material, and in the second compensation plane, which lies opposite in region of an end wall of the external rotor, with possible attachment of material.

2. The method as claimed in claim 1, wherein the E.C. motor has a rated rotational speed and further comprising carrying out the balancing process at a rotational speed which lies below the rated rotational speed of the motor of the air blower unit.

3. The method as claimed in claim 2, wherein the motor has a rated rotational speed of approximately 30,000 rpm.

4. The method as claimed in claim 1, wherein, in the first compensation plane, the erosion of material is carried out at one or both of two cover plates of a fan impeller of the blower.

5. The method as claimed in claim 1, wherein, in the second compensation plane, the attachment of material includes placing the material in a groove provided in the end wall of the external rotor.

6. The method as claimed in claim 5, wherein the attached material includes at least one of compensation weights in the form of balls which are pressed into the groove, and compensation weights of sufficient mass and with a suitable shape provided in the region of the end wall of the external rotor by other techniques including bonding, warm embossing and embossing by ultrasonic sound.

7. The method as claimed in claim 5, wherein the attached material is balancing putty.

8. The method as claimed in claim 1, used for balancing an electrically operated air blower unit of the type constituting a secondary air blower unit used for blowing additional air into the exhaust gas passage of an internal combustion engine.

* * * * *